United States Patent [19]
Richey, Jr. et al.

[11] Patent Number: 5,115,015
[45] Date of Patent: May 19, 1992

[54] HIGH SOLIDS COATING COMPOSITIONS

[75] Inventors: Forrest A. Richey, Jr., Charleston; Kenneth L. Hoy, St. Albans, both of W. Va.

[73] Assignee: Union Carbide Chemicals & Plastics Technology Corporation, Danbury, Conn.

[21] Appl. No.: 681,459

[22] Filed: Apr. 4, 1991

Related U.S. Application Data

[63] Continuation of Ser. No. 81,243, Jun. 29, 1987, abandoned.

[51] Int. Cl.$^5$ .............. C08L 75/00; C08L 77/00; C08F 8/32
[52] U.S. Cl. .................. 524/507; 524/514; 524/589; 524/590; 524/591; 524/607; 525/113; 525/124; 525/131
[58] Field of Search ........... 524/507, 514, 589, 590, 524/591, 607, 608

[56] References Cited

U.S. PATENT DOCUMENTS

| | | | |
|---|---|---|---|
| 3,983,268 | 9/1976 | Scharf et al. | 427/341 |
| 4,417,022 | 11/1983 | Chang et al. | 524/598 |
| 4,520,167 | 5/1985 | Blank et al. | 525/131 |
| 4,814,382 | 3/1989 | Hoy et al. | 525/113 |

FOREIGN PATENT DOCUMENTS 2392090  12/1978  France .

Primary Examiner—Paul R. Michl
Assistant Examiner—Peter Szekely
Attorney, Agent, or Firm—Gerald L. Coon

[57] ABSTRACT

AmBifunctional reactive diluent are provided for use in the preparation of high solids coatings. The diluents are of a structural configuration that they do not disturb a coating composition's stoichiometric ratio of nucleophilic and electrophilic groups. The invention also provides a process for the preparation of high solids coatings which utilizes the diluents.

22 Claims, No Drawings

HIGH SOLIDS COATING COMPOSITIONS

This application is a continuation of prior U.S. application Ser. No. 081,243, filed Jun. 29, 1987 now abandoned.

FIELD OF THE INVENTION

This invention relates in general to high solids coating compositions. In one aspect this invention is directed to stoichiometrically balanced reactive diluents useful in the preparation of high solids coatings. In a further aspect this invention is directed to reactive diluents which do not disturb a coating composition's stoichiometric ratio of nucleophilic and electrophilic groups. In another aspect, this invention is directed to a process for the preparation of the coatings containing the reactive diluents and of the cured products prepared from such compositions.

BACKGROUND OF THE INVENTION

In the past, coating compositions were commonly prepared by dissolving or dispersing film-forming organic polymers in volatile organic compounds (VOC). Environmental and health concerns associated with applications involving large-scale vapor emissions have led to research in the development of coating compositions wherein the emission of volatile organic compounds is minimized.

Among the various methods of reducing the vapor emissions of coating compositions, the use of reactive diluents to replace all or part of the volatile organic solvent component of a coating composition is of particular interest. As used herein, the term "reactive diluent" refers to nonvolatile or nearly non-volatile organic solvents or dispersants having as an integral part of their molecular structure, functional groups which are reactive with a film-forming polymer and/or cross-linking agent.

In addition to providing a low level of volatile emissions, a coating composition should have a sufficiently low viscosity to permit easy handling and application. Other desirable properties in a coating composition are sufficient stability to ensure a commercially acceptable shelf life and the ability to provide a cured coating having suitable properties such as toughness, adhesion, scratch resistance, weatherability, and resistance to attack by solvents, acids, bases and other chemicals. Coating compositions wherein all or a portion of the volatile organic solvent component thereof is replaced by a reactive diluent are illustrated by the following patents:

U.S. Pat. No. 4,417,022, to Chang et al. discloses coating compositions, the vehicle portion of which consists essentially of from about 60 percent to about 97 percent of a curable film forming component and from about 3 percent to about 40 percent of an organic reactive diluent capable of chemically combining with the curable film-forming component. Disclosed as reactive diluents are ethers having less than five ether groups, amides, esters, urethanes, ureas, sulfur-containing compounds, and mixtures thereof which have one primary or secondary hydroxyl group. The reactive diluents disclosed by Chang et al, are further characterized as having a retained solids value of greater than about 80 percent, a hydroxyl equivalent of from about 180 to about 800, and a liquid viscosity of less than about 10 poise at 60° C. Preferred reactive diluents disclosed by Chang et al are ester-containing reactive diluents, with ester-containing reactive diluents having allyl side chains being most preferred. Coating compositions having ester-containing reactive diluents, however, tend to produce cured coatings which lack desirable adhesion, hardness and/or weatherability As a further example, U.S. Pat. No. 4,520,167 to Blank et al., discloses a coating composition comprising (a) a hydroxyalkyl carbamate of the formula:

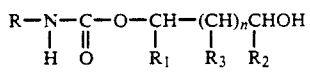

wherein n is 0 or 1, R is a $C_1$ to $C_{20}$ organic moiety which may contain one or more constituents selected from the class consisting of hetero-atoms and hydroxyl groups, and each of $R_1$, $R_2$ and $R_3$ is independently H or $CH_3$; (b) an aminoplast cross-linker; and (c) a polymer containing active sites which at elevated temperatures are reactive with the amide-aldehyde crosslinker (b).

Cured coatings formed from the coating compositions containing the reactive diluents exemplified by Blank et al. are, within a range of environmentally acceptable formulations, widely variable as regards the surface properties possessed by same.

Among the compounds which have been offered for use as reactive diluents in coating compositions are dicyclopentenyl-oxyethyl ethyl methacrylates, modified caprolactones, and unsaturated melamines. In general, these compounds are poor solvents, have relatively high viscosities and/or produce cured coatings having undesirable chemical and/or physical properties.

A cured coating's toughness, adhesion, impact resistance, abrasion resistance, scratch resistance, weatherability and resistance to chemical attack depend to a large extent upon the film-forming polymer and reactive diluent and cross-linker components of the composition used to produce same. As disclosed in U.S. patent application Ser. No. 759,172 filed on Jul. 26, 1985, now abandoned and U.S. patent application Ser. No. 807,738 filed Dec. 11, 1985, now abandoned both in the name of K. L. Hoy, et al., coating compositions containing carbamate and urea derivatives as reactive diluents are found to provide cured coatings having desirable toughness and adhesion.

As indicated above, industrial use of coatings is being increasingly limited in the amount of volatile organic compounds it can release into the atmosphere by government regulations intended to protect the environment and those who apply the coatings. This increasing pressure for change has created an opportunity for new technologies with potential for lower VOC. As mentioned above, one of these is the use of reactive diluents or cosolvents in place of all or part of the volatile organic solvents of the prior art. Many early attempts to provide reactive cosolvents or diluents have failed because the resulting coating compositions suffered from degraded application or end-use properties. In fact, there have been very few if any commercially significant implementations of reactive cosolvents to date.

In the present invention, the earlier deficiencies have been borne in mind and new classes of compounds evaluated which would confer useful application and ultimate properties on coating compositions and the coatings derived therefrom. As previously indicated, these properties include proper wetting, rheological and shelf stability of the coating composition, and adhesion, flexibility, hardness and resistance to weathering and solvents of the cured product.

In accordance with the present invention, the synthesis of a basically different class of reactive diluents was undertaken. These diluents are called "AmBifunctional" or "AB"- type materials because they combine in one molecule balanced amounts of the two different types of reactivity ("A" and "B") usually segregated into different molecules in the traditional film-forming ingredients of coating compositions. The prior art materials evaluated to date in the search for new reactive diluents can be classed as type "A" or "AA" or multi-"A" materials in which the "A"'s stand for two or more reactive nucleophilic or acidic hydrogen groups, such as, OH or NH groups. These "A" groups react with type "B" groups or electrophilic groups during the cure of the coating. Example of "B"-type groups are the alkoyxmethylene and hydroxymethylene amino groups of aminoplast crosslinkers.

The compounds depicted by structural formula below, illustrate the types of compounds which have "A" and "B" reactive groups. The particular reactive groups has been identified by A or B in a circle.

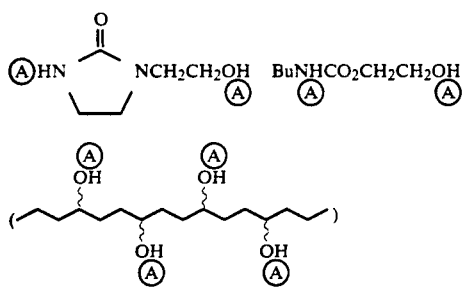

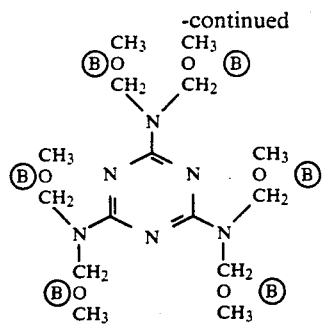

Thus, as indicated above, most of the materials studied to date in the search for new reactive diluents can be classed as type "A" or "AA" or multi-"A" materials in which the A stands for two or more reactive nucleophilic groups. These "A" groups react with "B" or electrophilic groups during the acid catalyzed cure of the coatings.

A discussion of aminoplast coating cure reactions of the prior art, will aid in understanding the "AB" reactive diluent concept and its value in coatings. Under acid catalysis (e.g. p-toluenesulfonic acid; PTSA) the aminoplast (e.g. Cymel-303) is protonated and dissociated or partially dissociates into alcohol (methanol in the case of Cymel-303) and an iminium ion. The iminium ion can then react with other alcohols while the more volatile methanol is removed from the matrix by evaporation. If the average effective functionality of the coating ingredients exceeds two, there will be crosslinking resulting in an insoluble composition. The overall chemical reaction is set forth below wherein the iminium ion is similar to an isocyanate in its reactivity with OH and NH groups.

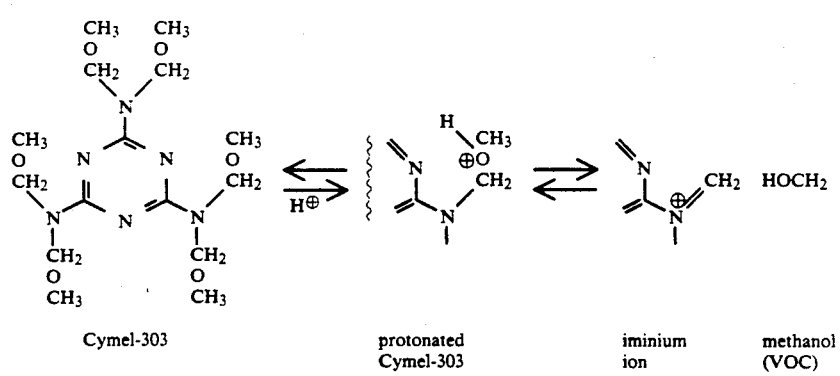

Subsequent reaction of the iminium ion with a film-forming polymer can be shown as follows:

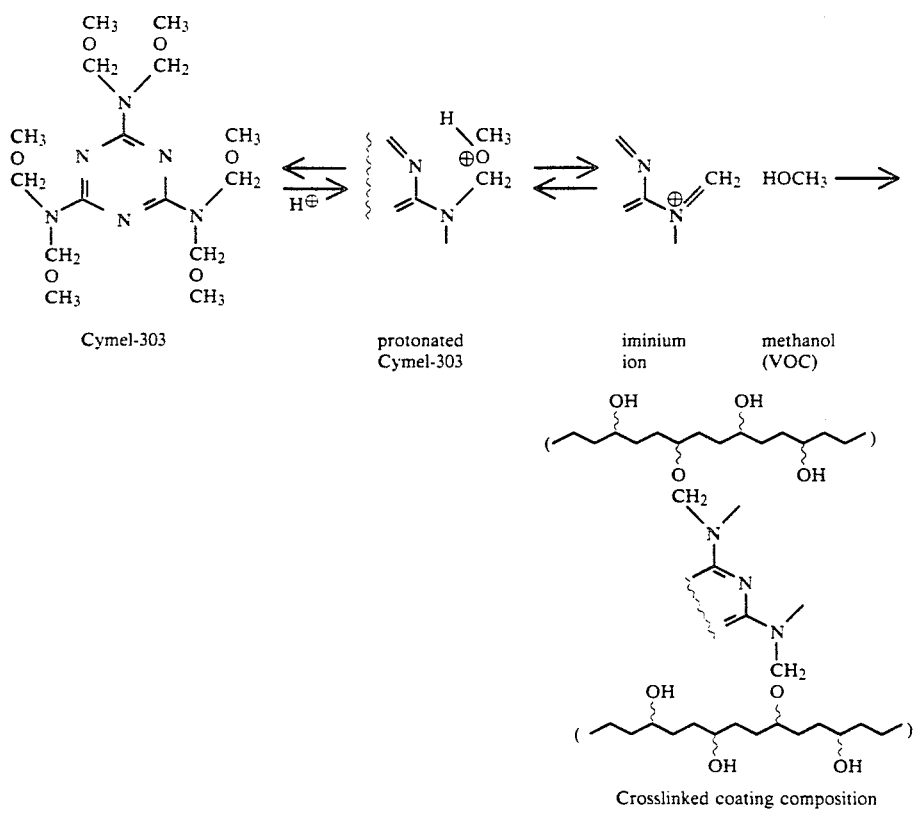

Cymel-303    protonated    iminium    methanol
             Cymel-303      ion        (VOC)

Crosslinked coating composition

These "AA" molecules have certain deficiencies from the viewpoint of the coatings technologist. These deficiencies stem from the fact that the reactive diluents have a low equivalent weight and, thus a large requirement for crosslinker relative to that of the film-forming polymer. This low equivalent weight is a consequence of having at least two reactive groups in a molecule small enough to have reasonably low viscosity and high solvency. Thus, when the coatings technologist wishes to adjust the amount of reactive solvent in a coating composition to achieve final application viscosity, he may be required to change the amount of the crosslinker (e.g., Cymel aminoplast or a polyisocyanate), to compensate for the added reactive groups of the solvent.

The adjustment to the amount of crosslinker will also change the viscosity of the composition. Thus optimization of the formulation is complicated by use of this stoichiometrically unbalanced, "AA" type of reactive diluent and adjustments to viscosity can become an iterative process. Another undesirable consequence of having to add more crosslinker to balance the reactive diluent is that it brings more potential for methanol emissions into the coating formulation. This is because the functionality of a melamine crosslinker is typically less than or equal to four but it can bear more than the four groups that actually participate in forming coating crosslinks. Thus, it would be much more desirable to be able to vary the amount of the reactive diluent widely without having to vary the amount of crosslinker. It was to fill this need for a reactive diluent that would not upset the stoichiometry of a coating composition that the concept of the "AmBifunctional" reactive diluent was conceived. Rather than having two or more reactive OH or NH functional groups which can react with the crosslinking agent, such as an aminoplast, an epoxide or a blocked isocyanate, the new "AmBifunctional" compounds of the present invention combine equal amounts of the chemical reactivity of a crosslinker (or electrophile) and an active hydrogen compound (or nucleophile) in the same molecule. Thus their use does not require that the ratio of crosslinker to film-forming polymer be adjusted. Initially, materials having one each of the OH or NH (type A, nucleophilic) groups and methylolamido or methoxymethyleneamide groups (type B, electrophilic) have been prepared. These AB molecules are valuable diluents because they confer on the cured coating compositions the advantages of the "AA" molecules which have previously been employed without radically changing the coating composition's stoichiometry as the "AA" materials do.

Accordingly, one or more of the following objects will be achieved by the practice of the present invention. It is an object of this invention to provide AmBifunctional reactive diluents which are useful in the preparation of high solids coatings. Another object of this invention is to provide AmBifunctional reactive diluents which do not adversely affect a coating composition's stoichiometric ratio of nucleophilic and electrophilic groups. A further object of this invention is to provide certain carbamates, ureas and amides which are suitable as stoichiometrically balanced reactive diluents Another object of this invention is to provide a process for the preparation of coating compositions. A still further object of the present invention is to provide cured coating compositions prepared from formulations containing the reactive diluents. These and other objects will readily become apparent to those skilled in the art in the light of the teachings herein set forth.

SUMMARY OF THE INVENTION

In its broad aspect, the present invention relates to high solids coating compositions which contain certain stoichiometrically balanced reactive diluents, and the cured compositions therefrom. The high solids coating compositions of the present invention are comprised of:
(a) at least one cross-linkable organic polymer,
(b) at least one solvent selected from the group consisting of water and an organic solvent,
(c) at least one cross-linking agent, and
(d) optionally, a catalyst,
(e) At least one reactive diluent of the formula:

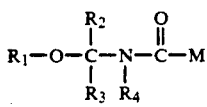 (I)

wherein:

$R_1$ represents hydrogen, or alkyl of from 1 to 4 carbon atoms;

$R_2$ and $R_3$ individually represent hydrogen, alkyl of from 1 to 2 carbon atoms;

$R_4$ represents hydrogen, alkyl of from 1 to 10 carbon atoms, hydroxyalkyl, alkyleneoxy and polyalkyleneoxy groups of from 2 to 10 carbon atoms;

M represents: $-R_5$, $-OR_5$ or

wherein:

$R_5$ and $R_6$ represents hydrogen, alkyl of 1 to 10 carbon atoms, hydroxyalkyl of 2 to 10 carbon atoms, or alkyleneoxy and polyalkyleneoxy groups of from 2 to 10 carbon atoms and optionally contains one hydroxyl group; with the provisos that:
(a) when $R_5$ is attached to oxygen it is not hydrogen, and
(b) there is only one NH group or only one OH group in the molecule in addition to the OH group which may be present when $R_1$ is hydrogen.

It is evident from the above formula (I) that the reactive diluents employed in the present invention include carbamates, ureas and amides of the respective formulas:

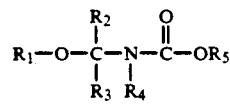 (II)

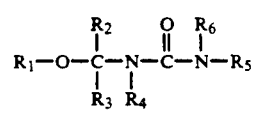 (III)

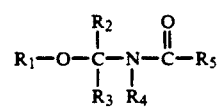 (IV)

where M and $R_1$ 14 $R_6$ are as indicated above.

It should be noted that in each of the above classes of reactive diluent compounds the particular carbamate, urea or amide may not be a pure compound but can contain small amounts of other closely related compounds which may not be considered to be true AmBifunctional compounds within the meaning of this invention. However, the greatest percentage of the carbamates, amides or ureas is comprised of the compounds of the above formulas.

It is of course possible to employ the reactive diluents of the present invention in combination with diluents previously employed in prior art processes such as those of the "A" and "B" type.

Preparation of the reactive diluents of the present invention can be effected by several methods. Those based on addition of formaldehyde and other aldehydes optionally followed by esterification with alcohols to form the alkyl methylene ethers are considered to be the most practical for commercial use. Several other methods for preparing "AB"-type molecules have been found in the literature. For example, In Phan, X. T. and Shannon, P. J., *J. Org. Chem.*, 48, 5164 (1983) there is disclosed a photolysis method in methanol of an N-chloro amide which has at least one carbon substituent on nitrogen with replaceable alpha hydrogens. The product is an alpha-methoxy amide which fits the definition of an "SB" molecule providing that there were no other "A"- or "B"- type reactive groups in the overall molecule.

The methylenemethoxy and methylol derivatives of amides and ureas are available from the corresponding amides and ureas via reaction with formaldehyde and methanol. See H. E. Zaugg and W. B. Martin, "Alpha-Amidoalkylations at Carbon", pp 52-269, in A. C. Cope (Ed.), *Organic Reactions*, Volume 14, John Wiley and Sons, Inc., New York, 1965.

In practice, the reactive diluents can be prepared under mild conditions and in simple reaction equipment which minimizes capital requirements for commercialization and utilizes existing processing equipment. The raw materials employed, i.e. alkyl amines, carbon dioxide, ethylene oxide, methanol and formaldehyde are all relatively inexpensive and accordingly provide an economical route to desirable diluents.

As indicated previously, the reactive diluents of the present invention are particularly useful in the preparation of high solids coatings from environmentally acceptable formulations. These high solids coating compositions are made by blending a crosslinkable organic film-forming polymer, at least one stoichiometrically balanced reactive diluent, a crosslinking agent and optionally, a crosslinking catalyst. The resultant high solids coating compositions can be either solutions or dispersions depending on the choice of solvent, polymer and other components such as pigments and on the choice of the reactive diluent. The reactive diluents are designed to disturb coating composition stoichiometry as little as possible.

The reactive diluents used herein include compounds which exist in solid or liquid form at 25° C. However, solid diluents must be capable of being solubilized in use. For ease in handling and composition formulation, reactive diluents which are liquids at 25°C., preferably 0° C., are preferred.

Suitable cross-linkable organic polymers for use in the present invention include polymers which contain a plurality of reactive —OH and/or —NHCO— groups, such as, for example: polyurethane resins, polyester alkyd resins, hydroxyl-containing epoxy fatty acid esters, hydroxyl-containing polyesters, hydroxyl-containing alkyd resins, hydroxyl-containing acrylic interpolymers, and hydroxyl-containing vinyl interpolymers, such as styrene/acrylic copolymers.

Illustrative of cross-linking agents suitable for use herein are methylol phenols such as, for example. 2,4,6-trimethylolphenol; polyepoxides such as, for example, glycidyl epoxides or cycloaliphatic epoxides, representative of which are Araldite 297, commercially available from Ciba Geigy Corporation, and Epon 582, commercially available from Shell Oil Corporation; aminoplasts including the reaction product of aldehyde (e.g., formaldehyde, acetaldehyde, paraformaldehyde, trioxane, etc.) with urea, thiourea, melamine, benzoguanamine, acetoguanamine, dicyandiamine and the like; polyisocyanates and blocked polyisocyanates; and the like.

Aminoplasts which are of particular value in high solids coating compositions are the methylated urea-formaldehyde resins, the alkylated benzoguanamines and methylated melamine-formaldehyde resins with methylated melamine-formaldehyde resins being the most desirable.

The relative quantities of cross-linkable polymer, volatile diluent present in a given composition are subject to variation, depending on factors which include: the solubility characteristics of the various composition components, properties required in a finished coating, economics, volatile organic compound emission limitations and the method of coating application.

In general coating compositions comprise from about 30 to about 70 weight percent of a combination of reactive diluent and volatile organic compound and from about 70 to about 30 weight percent of a combination of cross-linkable organic polymer and cross-linking agent, all based upon the total weight of the cross-linkable organic polymer, reactive diluent, volatile organic compound and cross-linking agent thereof.

The ratio of reactive diluent to volatile organic compound present in a given composition is largely dependent upon the solubility parameters of the cross-linkable organic polymer, reactive diluent and volatile organic compound employed therein. For example, coating compositions wherein the reactive diluent is a good solvent for the cross linkable organic polymer can generally be formulated at higher reactive diluent to volatile organic compound ratios than coating compositions wherein the cross-linkable organic polymer is not as readily solubilized in the reactive diluent. The reactive diluent to volatile organic compound weight ratios of the coating compositions of this invention typically range from about 1/19 to about 3/2. Compositions wherein the reactive diluent to solvent weight ratio is within the higher region of this scale (i.e., in excess of about ½) are generally preferred for applications having relatively stringent volatile organic compound emission requirements.

It should be appreciated that a coating composition may be formulated at higher reactive diluent to volatile organic compound ratios than are described above, (i.e.,about 3/2 to about 9/1).

Most preferably, a composition is provided with sufficient crosslinking agent to provide a cross-linkable organic polymer to crosslinking agent weight ratio of from about 9/1 to about 1/1.

The compositions of this invention may be further comprised of one or more cross-linking catalysts. Catalyst selection is usually dictated by the choice of cross-linking agent, For example. If aminoplasts having methoxymethyl functionality are employed to cross-link the organic polymer and reactive diluent, a strong acid catalyst is preferred. Illustrative of the strong acid catalysts of the invention are one or more of the following: alkylsulfonic acids, such as p-toluenesulfonic acid, alkylarylsulfonic acids such as a $C_{10}$ to $C_{18}$ alkylbenzenesulfonic acid, and the like. Whereas, if aminoplasts having methoxymethyl-imino functionality are employed as cross-linking agents, weak acid catalysts are preferred. Weak acid catalysts include one or more of the following: phosphate ester such as dialkyl hydrogen phosphate, aryl hydrogen phosphates and the like, as well as carboxylic acids having pKa values in excess of about 1.9 such as citric, maleic and phthalic acid. When the crosslinking agent is a diisocyanate or a blocked isocyanate, suitable catalysts include tertiary amines such as triethyl amine, bis(dimethylaminoethyl) ether and the like. Organometallic salts of tin, mercury, zinc, bismuth and the like, such as dibutyl tin diacetate, zinc octoate, phenyl mercuric acetate and bismuth octoate.

The amount of catalyst required to promote the reaction is dependent upon the curing conditions required in the coating process employed. Those skilled in the art may readily determine the catalyst level with a routine amount of experimentation. In practice, if a catalyst is desired it is usually employed in a concentration of about 0.02 to about 2.5 percent by weight, based on the weight of the film-forming polymer.

In addition to the previously described components, the compositions of this invention may further comprise one or more additives such as are conventionally included in coating compositions.

Conventional additives, include pigments, surface active agents, plasticizers, biocides, antistatic agents and the like. When present, the total amount of all such conventional additives typically does not exceed about 50 weight percent of the coating composition; the total amount of surface active agent and plasticizers present generally representing less than about 2 percent of the total composition weight.

The following examples are illustrative of the present invention:

EXAMPLE 1

Preparation of Hydroxymethylene and Methoxymethylene Derivatives of Hydroxyethyl Butylcarbamate (HEBC)

A mixture of 25.21 grams (0.1566 moles) of hydroxyethyl butylcarbamate and 119.1 grams of formalin (approximately 1.3 moles of formaldehyde at a gas chromatographically determined purity of about 32 percent), 175.21 grams of methanol and 0.32 grams (0.1 Wt % on the total mixture) of p-toluenesulfonic acid was allowed to stand at room temperature for a total of 7 hours. Analysis by gas chromatography at this point showed very little reaction. Accordingly the mixture was heated to about 60° C. After a total of five hours at the higher temperature, the amount of new materials as represented by GC peaks at longer retention times was approximately as great as the HEBC starting material. An additional 10 hours of heating at 70° C. gave a product in which the peaks for products were about twice as large as the raw material peak. At this point a sample of the crude product was taken and the acid neutralized with sodium bicarbonate and the volatile materials removed by stripping under vacuum at 20°–30° C. The resulting oil was filtered to remove solids.

The filtered oil was analyzed by GC (results in area %), GC/IR and GC/MS giving the following results: 6.8% lights, ( later determined by GC/MS-GC/IR to be formaldehyde and suspected to be generated during the GC analysis), 5.0% HEBC ( by GC retention time and both GC/IR and GC/MS), 12.2% of another material which elutes slightly later than HEBC: but appears by GC/IR and GC/MS to be identically the same as HEBC (This peak is thought to be HEBC eluting from decomposition of the hydroxymethylene adduct. Later work with direct inlet mass spectroscopy showed that a mass/charge ratio 191 material was present. It is presumed that this peak was from the hydroxymethylene adduct of HEBC)., 65.9% of the major product which appears to be mostly one isomer of a methoxymethylene derivative of HEBC (by GC/IR and GC/MS, probably the isomer with the methoxymethylene substituent on the nitrogen) and also contains a much smaller amount of another material at the same molecular weight (205, correct for the methoxymethylene adduct of HEBC, probably substituted on the oxygen), 6.34% of the bis-methoxymethylene adduct (one each on the OH and the NH of the HEBC, identified by its m/e ratio of 549 and the IR) and finally a peak of 2.2 area % of MW 207 which is presently of unknown structure. Thus 98.5 area % of the product by GC analysis has been analyzed and all but 2.2% of this identified from the GC, GC/IR and GC/MS results.

The product is a colorless liquid of viscosity 64.3 cps at 26° C. When heated alone or with Cycat-296 or p-toluenesulfonic acid it behaves as follows:

| Catalyst | Temperature | Time | Results |
|---|---|---|---|
| None | up to 180 C. | 15 min. | darkens, outgases, still low viscosity |
| 0.2% pTsOH | 150 C. | 15 min. | no thickening, outgases |
| 1 pTsoH | 120 C. | 15 min. | marked thickening, less outgassing |
| 1% Cycat-296 | 120 C. | 15 min. | little or no thickening |

EXAMPLE 2

Two stage Preparation of The Methoxymethylene Derivative of HEBC

A mixture of 53.5 grams (0.33 mole) of HEBC, 50 cc of methanol and 78 grams (about 72.5 cc, 0.66 mole at the stated 37% formaldehyde concentration, 2 equivalents based on the HEBC) of formalin was placed in a 250 cc, flask equipped with a reflux condenser and magnetic stirrer. The pH of the resulting mixture was measured by wet, broad range pH paper as about 6. The pH was adjusted to about 9 by addition of 0.2 cc of 6N NaOH solution (about 1.2 meq of NaOH). A very slight exotherm ( 3 Centigrade degrees) was noted during the caustic addition.

The resulting clear, colorless solution was allowed to stand with stirring at room temperature for 120 hours, and a sample was taken and freed of volatiles in a stream of nitrogen at hot tap water temperature ( about 50° C.) and finally under vacuum at room temperature. An infrared spectrum of the crude product showed no appreciable differences as compared to an authentic simple of the HEBC starting material. An aliquot of the reaction mixture (about 12.5 cc, 14.5 grams) was placed in a vial with 0.5 gram (about 2.25 cc, 14.5 grams) of Dow MSC-1 strongly acidic, macroreticular ion exchange resin in the hydrogen form. The resulting slurry was stirred at room temperature for 2.5 hours. A 1-cc sample was taken and freed of volatiles and an infrared spectrum taken. The spectrum showed the material to have less OH/NH absorption in relation to the amount of CH absorption as compared with the starting material. This is probably an indication of etherification of a $CH_2OH$ intermediate with methanol. The remainder of the slurry was allowed to stir overnight and then heated at 50°-60° C. for 3 hours and cooled to room temperature and a sample taken for I.R. The stripped sample's spectrum showed a weaker NH/OH absorption than that of the CH region. This is taken to indicate that a methylol or other OH/NH had been converted to a methoxymethylene derivative. NMR spectrometry of this sample showed absorption due to the sample in the same places as the spectrum of the first preparation of this derivative but with different intensities. This may indicate a different mixture of derivatives in the present, two-stage preparation than in the first preparation.

EXAMPLE 3

Attempted Preparation of the Methoxymethylene Derivative of HEBC with Dimethoxymethane as Reagent.

A mixture of 10.04 grams ( 0.062 mole) of HEBC and 83.9 grams ( 1.10 mole) of dimethoxymethane (DMM) and 1754.04 grams of methanol was placed in a flask and allowed to stand at room temperature for a total of seven hours with no apparent product formation by GC. At the end of a total of 72 hours, 0.1 weight percent of p-toluenesulfonic acid was added and the resulting mixture allowed to stand at room temperature for another 96 hours with no apparent reaction by GC analysis. In Example 4 below, it was shown that HEBC and DMM can be caused to react under pressure.

EXAMPLE 4

Preparation of the Methoxymethylene Derivative of HEBC with Dimethoxymethane as Reagent and Under Pressure to Allow Operation at Higher Temperature Three experiments were performed in which varying ratios of DMM to HEBC were employed to convert the HEBC to its methoxymethylene derivatives. These experiments were carried out in borosilicate glass Fisher-Porter vessels which allowed operation at superatmospheric pressure while still maintaining visual observation. The conditions and results are tabulated in Table I below. Amounts of materials are given in grams and temperatures are in degrees centigrade. Gas Chromatographic analysis of the products indicated that the desired product was formed in approximately the same ratio to starting material that would be observed if formalin had been used. As expected, both the pressure of the reactions and the ratio of products to starting material increased as the mole ratio of DMM to HEBC increased.

TABLE I

| HEBC Reactions with Methylal | | | |
|---|---|---|---|
| Run | 1 | 2 | 3 |
| HEBC | 1001 | 163.8 | 79.4 |
| MeOH | 1585 | 329.5 | 169 |
| DMM | 946 | 393.8 | 380 |
| $H_2SO_4$ | 3.12 | 1.3 | 0.92 |
| Temp. | 100 | 100 | 100 |
| PSIG | 25 | 31 | 35 |
| Mol HEBC | 6.2 | 1.01 | 0.493 |
| Mol DMM | 12.4 | 5.18 | 5 |

TABLE I-continued

| DMM/HEBC Mol ratio | 2 | 5.1 | 10.1 |
|---|---|---|---|
| Weight ratio of Product to HEBC | | | |
| 0 Hour | | 0.77 | 1 |
| 1 Hour | 0.33 | 1 | 1.8 |
| 3 Hour | 0.33 | 1 | 2 |

EXAMPLE 5

PREPARATION OF 2-HYDROXYETHYL N-BUTYL-N-METHOXYMETHYLENECARBAMATE (HEMMBC)

The methoxymethylene derivative of HEBC was prepared by forming a mixture of.256.47 grams ( 1.6 moles ) of HEBC, 1220.3 grams ( 450.8 grams $CH_2O$ contained 15.03 mole) of Formalin ( 37% formaldehyde in water/methanol), 1754 grams methanol and 3.26 grams PTSA (p-toluenesulfonic acid) and heated at 60°-70° C. for approximately 10 hours. The resulting mixture was neutralized with excess sodium bicarbonate and freed of volatiles under vacuum at 50° C. A sample of the resulting pale yellow oil was submitted for analysis by coupled Gas Chromatography/ Mass Sectrometry/ Fourier Transform Infrared spectrometry. The results of the analysis were consistent with the proposed structure as the major component of the mixture as stated by GC Area percent. Other components of the mixture were identified as the O-methoxymethylene ether and the N,O-bis-methoxymethylene ether.

EXAMPLE 6

Preparation of 2-Hydroxyethyl N-(2-Ethylhexyl)-N-Methoxymethylcarbamate (HEMMEHC)

A mixture of 349.4 grams ( 1.6 mole ) of 2-hydroxyethyl 2-ethylhexylcarbamate (HEEHC), 1220.87 grams ( 451.72 grams, 15.10 moles contained formaldehyde) formalin solution, 1756.1 grams ( 54.87 moles ) of methanol and 3.38 grams ( 0.1 weight percent ) of p-toluenesulfonic acid was placed in a 4-necked, 5-liter flask equipped with magnetic stirrer, heating mantle, thermometer, nitrogen supply means, reflux condenser cooled by solid carbon dioxide. The liquid contents of the flask were heated to 67°-72° C. for a total of about 13 hours. The resulting solution was neutralized with an excess of sodium bicarbonate and allowed to stand. Filtration, removal of volatiles by evaporation in a rotary evaporator and filtration to remove an additional deposit of solid (presumably sodium salts that had been dissolved) gave a pale yellow, liquid product (338.19 grams, about 80% yield if the product were pure HEMMEHC). The product was approximately a 1:3 mixture of HEEHC TO HEMMEHC (meaning a mixture of about 4 products analogous to the butyl case) by capillary gas chromatography. Previous analysis of the butyl analog indicated that the products were understated by such an analysis so that the true (weight) ratio of raw material to products was probably much more slanted toward products. The specific gravity of this material was 1.022 measured at 24° C. and its viscosity was 175 cps at 25° C.

EXAMPLE 7

In order to demonstrate the utility of the reactive diluents of the present invention in the preparation of solid coatings, various resin compositions were prepared and evaluated using the compounds of the present invention. In the experiments which follow, the resin mix was prepared in the sequence listed. The Cymel resin, catalyst if used, and reactive diluent were added to the resin mix. The percent incorporation was calculated based on the total solids measurements at 125 and/or 150° C. Approximately one gram of the composition was weighed to the fourth place and spread as a thin film on aluminum foil and dried one hour in a forced draft oven at the indicated temperature. Calc.=((wt. of composition $\times$ % T.S.)−(weight of resin mix $\times$ % T.S.))/(weight diluent $\times$ 100) Films were cast to obtain 1 mil dry thickness, flashed for 5 minutes at room temperature, and baked at the indicated temperature for 30 minutes to obtain physical properties. The acrylic resin mix formulation employed was as follows:

| component | grams |
|---|---|
| Acryloid AT-400 (high solids acrylic resin from Rohm & Haas) | 414.4 |
| n-Butanol | 98.4 |
| UCAR PM Acetate (methoxypropyl acetate from Union Carbide Corp.) | 29.6 |
| SAG L-5310 silicone antifoam from Union carbide Corp., (1:1 in butanol) | 0.5 |

In Table II which follows the physical properties of the compositions prepared using the reactive diluents of the present invention are set forth. The reactive diluent employed in runs 1-18 was 2-hydroxyethyl methoxymethylene butylcarbamate, (HEMMBC) and in runs 19-21 2-hydroxyethyl- N-(2-ethylhexyl)-N-methoxymethylenecarbamate (HEMMEHC). p-Toluenesulfonic acid was used in runs 13-21. In the pencil hardness test F stands for firm. In the experiments the panels were baked at 125 degrees C. for 30 minutes on Bonderite.

In Table II, CYMEL (TM) 323 is a methylated melamine formaldehyde resin available from American Cyanamid Company, and CYMEL (TM) 1133 is a methylated, butylated melamine-formaldehyde resin available from American Cyanamid Company.

TABLE II

| Run | Ratio AT-400/CYMEL 323 | Reactive[2] Diluent | Incorp. 125° C. | % Sward Hardness Cycles | Impact In-Lbs Direct | Impact In-Lbs Reverse | MEK Double Rubs | Gloss 20 Deg. |
|---|---|---|---|---|---|---|---|---|
| 1 | 77.2:22.8 | Control | | 39 | 15 | <2 | >200 | 94 |
| 2 | 77.2:22.8 | 10 | 28.6 | 36 | 15 | <2 | >200 | 95 |
| 3 | 77.2:22.8 | 20 | 24.7 | 33 | 35 | <2 | >200 | 93 |
| 4 | 75:25 | Control | | 39 | 15 | <2 | >200 | 93 |
| 5 | 75:25 | 10 | 17.1 | 39 | 15 | <2 | >200 | 91 |
| 6 | 75:25 | 20 | 27.9 | 29 | 25 | <2 | >200 | 92 |
| 7 | 70:30 | Control | | 38 | 15 | <2 | >200 | 94 |
| 8 | 70:30 | 10 | 43.7 | 34 | 15 | <2 | >200 | 92 |
| 9 | 70:30 | 20 | 26.6 | 31 | 15 | <2 | >200 | 94 |
| 10[3] | 70:30 | Control | | 29 | 15 | <2 | >200 | 95 |

TABLE II-continued

| Run | Ratio AT-400/CYMEL 1133 | Reactive[2] Diluent | % Incorp. 125° C. | % Incorp. 150° C. | Sward Hardness Cycles | Impact In-Lbs Direct | Impact In-Lbs Reverse | MEK Double Rubs | Gloss 20 Deg. |
| --- | --- | --- | --- | --- | --- | --- | --- | --- | --- |
| 11 | 70:30 | 10 | 57.1 |  | 32 | 20 | <2 | >200 | 92 |
| 12 | 70:30 | 20 | 56.3 |  | 32 | 20 | <2 | >200 | 94 |
| 13 | 65:35[1] | Control |  |  | 35 | 10 | <2 | >200 | 97 |
| 14 | 65:35[1] | 10 | 84.0 |  | 34 | 15 | <2 | >200 | 95 |
| 15 | 65:35[1] | 20 | 63.0 |  | 29 | 20 | <2 | >200 | 95 |

| Run | Ratio AT-400/CYMEL 1133[3] | Reactive[2] Diluent | % Incorp. 125° C. | % Incorp. 150° C. | Sward Hardness Cycles | Impact In-Lbs Direct | Impact In-Lbs Reverse | MEK Double Rubs | Gloss 20 Deg. |
| --- | --- | --- | --- | --- | --- | --- | --- | --- | --- |
| 16 | 70:30[1] | Control |  |  | 32 | 40 | 2 | >200 | 91 |
| 17 | 70:30[1] | 10 | 54.5 | 14.0 | 29 | 40 | 2 | >200 | 88 |
| 18 | 70:30[1] | 20 | 50.0 | 41.4 | 22 | 35 | 2 | >200 | 85 |

| Run | Ratio AT-400/CYMEL 303 | Reactive[2] Diluent | % Incorp. 125° C. | % Incorp. 150° C. | Pencil Hardness | Impact In-Lbs Direct | Impact In-Lbs Reverse | MEK Double Rubs | Gloss 20 Deg. |
| --- | --- | --- | --- | --- | --- | --- | --- | --- | --- |
| 19 | 70:30[1] | Control |  |  | F | 25 | 5 | >200 | 91 |
| 20 | 70:30[1] | 10 | 72.6 | 75.9 | F | 20 | <2 | >200 | 88 |
| 21 | 70:30[1] | 20 | 73.4 | 74.4 | F | 20 | 5 | >200 | 88 |

[1]p-Toluenesulfonic acid added at 1.5% of resin solids.
[2]Percentage of diluent based on AT-400
[3]Aminoplast crosslinker changed to CYMEL 303 in runs 10-15.

Although the invention has been illustrated by the preceding examples, it is not to be construed as being limited to the materials employed therein, but rather, the invention relates to the generic area as hereinbefore disclosed. Various modifications and embodiments thereof can be made without departing from the spirit and scope thereof.

What is claimed is:

1. A high solids coating composition comprising:
   (a) at least on cross-linkable organic polymer which contains a plurality of reactive —OH— and/or —NHCO— groups;
   (b) at least one cross-linking agent having a functionality greater than 2 selected from the group of methylol phenol, polyepoxide, aminoplast, polyisocyanate and blocked polyisocyanate cross-linking agents;
   (c) at least one solvent selected from the group consisting of water and organic solvent:
   (d) at least one reactive diluent having difunctionality of the formula:

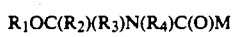

$$R_1OC(R_2)(R_3)N(R_4)C(O)M \qquad (I)$$

wherein:
   $R_1$ represents hydrogen or methyl;
   $R_2$ and $R_3$ individually represent hydrogen;
   $R_4$ represent hydrogen, alkyl of from 1 to 10 carbon atoms or hydroxyalkyl of from 2 to 10 carbon atoms; and
   M represents: —$R_5$, —$OR_5$ or —$N(R_5)R_6$
   wherein:
   $R_5$ and $R_6$ individually represent hydrogen, alkyl of from 1 to 10 carbon atoms or hydroxyalkyl of from 2 to 10 carbon atoms,
   with the proviso that:
   (i) when $R_5$ is attached to oxygen, it is not hydrogen;
   (ii) there is only one NH nucleophilic group or only one OH nucleophilic group in the molecule in addition to the OH nucleophilic group which may be present when $R_1$ is hydrogen; and
   (iii) the molecule has one each of (A) OH or NH nucleophilic groups and (B) methylolamido or methoxymethyleneamide electrophilic groups and (A) and (B) are stoichiometrically balanced.

2. The composition of claim 1 in which the reactive diluent comprises carbamate of formula I wherein M is —$OR_5$.

3. The coating composition of claim 1, wherein M represents —$R_5$.

4. The coating composition of claim 1, wherein M represents —$N(R_5)R_6$.

5. The coating composition of claim 1 wherein $R_1$ is alkyl, $R_2$ and $R_3$ are hydrogen, $R_4$ is methyl and M is $R_5$ which is hydroxyalkyl.

6. The coating composition of claim 1 wherein $R_1$ is methyl and $R_2$ and $R_3$ are hydrogen.

7. The coating composition of claim 1 wherein said reactive diluent is 2-hydroxyethyl methoxymethylene butylcarbamate.

8. The coating composition of claim 1 wherein said reactive diluent is 2-hydroxyethyl N-(2-ethylhexyl)-N-methoxymethylene carbamate.

9. The coating composition of claim 1 wherein the cross-linkable organic polymer is a member consisting of polyurethane resins, polyester alkyd resins, hydroxyl-containing epoxy fatty acid esters, hydroxyl-containing polyesters, hydroxyl-containing acrylic interpolymers and hydroxyl-containing vinyl interpolymers.

10. The coating composition of claim 1 wherein the cross-linkable organic polymer is an hydroxyl-containing polyester.

11. The coating composition of claim 1 wherein the cross-linkable organic polymer is a polyurethane resin.

12. The coating composition of claim 1 wherein the cross-linkable organic polymer is a polyester alkyd resin.

13. The coating composition of claim 1 wherein the cross-linkable organic polymer is a hydroxyl-containing epoxy fatty acid ester.

14. The coating composition of claim 1 wherein the cross-linkable organic polymer is a hydroxyl-containing alkyl resin.

15. The coating composition of claim 1 wherein the cross-linkable polymer is a hydroxyl-containing acrylic interpolymer.

16. The coating composition of claim 1 wherein the cross-linkable polymer is a hydroxyl-containing vinyl interpolymer.

17. The coating composition of claim 1 which further comprises a cross-linking catalyst.

18. A cured coating produced from the coating composition of claim 1.

19. A method for preparing a high solids coating on a substrate which comprises:
   (a) contacting said substrate with the coating composition of claim 1, and
   (b) curing said coating composition.

20. The method of claim 19 wherein a catalytic amount of a crosslinking catalyst is present.

21. 2-Hydroxyethyl N-butyl-N-methoxymethylenecarbamate.

22. 2-Hydroxyethyl N-(2-ethylhexyl)-N-methoxymethylenecarbamate.

* * * * *